United States Patent [19]
Brockman

[11] Patent Number: 6,125,727
[45] Date of Patent: Oct. 3, 2000

[54] TAIL FEED FOR ENGINE LATHE

[75] Inventor: David William Brockman, Levelland, Tex.

[73] Assignee: Tail Feed, Inc., Leveland, Tex.

[21] Appl. No.: 09/032,319

[22] Filed: Feb. 27, 1998

[51] Int. Cl.[7] ............................................ B23B 1/00
[52] U.S. Cl. ............................ 82/1.11; 82/148; 82/153; 82/154; 82/132
[58] Field of Search ............................ 82/1.11, 132, 134, 82/136, 148, 153, 154, 166, 118, 47

[56] References Cited

U.S. PATENT DOCUMENTS

| | | | |
|---|---|---|---|
| 1,907,938 | 5/1933 | Storm et al. ........................ | 82/148 X |
| 2,546,687 | 3/1951 | Brandenburg ....................... | 82/148 X |
| 2,768,539 | 10/1956 | Wollenhaupt et al. .............. | 77/32.3 |
| 3,258,997 | 7/1966 | Krisovitch ........................... | 77/60 |
| 4,048,881 | 9/1977 | Disston, Jr. ......................... | 82/148 |
| 4,235,135 | 11/1980 | McElroy ............................. | 82/2 R |
| 4,250,775 | 2/1981 | Jerue et al. ......................... | 82/1.11 |
| 4,339,857 | 7/1982 | Dickinson ........................... | 29/26 A |
| 5,778,744 | 7/1998 | Braun et al. ........................ | 82/1.11 |
| 5,842,392 | 12/1998 | Pfeifer et al. ....................... | 82/1.11 |

OTHER PUBLICATIONS

Engine Lathe Work by Fred H. Colvin, McGraw Hill Book Co., 1909, First Edition, Fourth Impression pp. 1 though 7.

*Primary Examiner*—Henry W. H. Tsai
*Attorney, Agent, or Firm*—Wendell Coffee

[57] ABSTRACT

A method and related structure for operating an engine lathe comprising performing the desired lathe operation by automatically translating the tailstock toward a workpiece and automatically stopping said translation at predetermined distances.

8 Claims, 9 Drawing Sheets

TAIL FEED FOR ENGINE LATHE

CROSS REFERENCE TO RELATED APPLICATION

None, however, Applicant filed Disclosure Document Number 424646 on Sep. 11, 1997 which document concerns this application; therefore, by separate paper it is respectfully requested that the document be retained and acknowledgment thereof made by the Examiner. (MOPEP 1706)

BACKGROUND OF THE INVENTION (1) Field of the Invention

This invention pertains to an improved method of operation and related structure of engine lathes. Engine lathe operators have ordinary skill in this art.

(2) Description of the Related Art

Lathes are a relatively old art. The design and operation of engine lathes has remained mostly unchanged from the early 1900's. The term engine lathe generally encompasses smaller less expensive lathes. Machine shops with lathes will generally have several engine lathes to do the bulk of their work and, if at all, they will typically have only one turret lathe. Because engine lathes are inexpensive, as compared to turret lathes, hourly operation costs are lower. In addition, engine lathes are less sophisticated than modern turret lathes and are therefore operated by junior personnel whose hourly rates are lower. Overall, having machine work done on an engine lathe is less expensive than having the same work done on a turret lathe.

An engine lathe, by virtue of its simplicity, cannot perform the functions of the more sophisticated turret lathes. More specifically, boring operations performed on an engine lathe before this invention were a time consuming and labor intensive operation. For example, on a typical job of drilling a 2⅜" hole in a stainless steel shaft for a total length of about 23", the cutting time for drilling the hole will take about 50 minutes. This means that a machinist must hand advance the drill into the workpiece for 50 minutes being in constant attendance.

In the art before this invention, the tailstock is loosened so that it slides along the tracks of the lathe. The tailstock is moved toward the workpiece until the tool is in close proximity to the workpiece. The tailstock is locked in position. The workpiece is rotated by operation of a rotable chuck. The tool is advanced into the workpiece by cranking a hand wheel that advances a spindle out of the tail-stock toward the workpiece. Therefore, a machinist must be in constant attendance of the machine slowly rotating a hand wheel to advance the tool into the workpiece.

It is known in the art before this invention to advance the tailstock toward the workpiece automatically; however, the advancement is accomplished by attaching the tailstock to the lathe carriage. Advancement is then accomplished by the lathe carriage pulling the tailstock toward the workpiece. A lathe carriage is designed for precision movement, e.g. cutting threads. Lathe carriages are not designed to withstand the large force necessary to advance the tailstock against a hard workpiece, e.g. stainless steel. Even though advancement may be automatic by this method, a machinist's attention is still required since the lathe carriage cannot automatically stop at a predetermined position.

SUMMARY OF THE INVENTION (1) Progressive Contribution to the Art

This invention pertains to an improved method of operating an engine lathe and corresponding structure. This invention removes the necessity of having a machinist be in constant attendance of the boring operation; and as such it removes the need of constant attention by a machinist. The structure required to facilitate movement of the tailstock, without using the lathe carriage, is relatively inexpensive. It will be understood that the feature of automatically advancing a drilling tool toward a workpiece is not a new idea and has been exercised in the realm of turret lathes or by dragging the tailstock with the lathe carriage. However, this invention gives the advantages of the turret lathe with a relatively inexpensive structure, and is also less detrimental to engine lathe equipment than dragging the tailstock with the lathe carriage.

This advancement is basically accomplished by anchoring a power unit to the lathe bed and then extending a screw jack from the anchored unit to the tailstock while the tailstock is loose and free to slide along the bed. Then automatic power rotation of the screw jack precisely, steadily and at an easily chosen speed advances the drilling tool against the workpiece. A measuring unit may be employed to move as the screw jack advances so that when the screw jack has moved a preset distance it will disengage driving dogs which rotate a screw jack element. The disengagement is assisted by having an angle on the contact face of the driving dogs.

Simply stated, a tool is mounted on the spindle and the spindle is fully extended from the tailstock. The tailstock is then slid along the track until the tool just contacts the workpiece. The improvement being that the tailstock is pushed toward the workpiece at a constant velocity without the use of the lathe carriage. The advancement of the tailstock is done automatically and the advancement is stopped automatically upon reaching a predetermined distance.

(2) Objects of this Invention

An object of this invention is to have an automatic system for advancing the tailstock of an engine lathe to facilitate the desired operation without constant attendance of a machinist.

Another object is the addition of a driving assembly to an engine lathe which thereby renders the engine lathe capable of operations heretofore only possible on a more expensive turret lathe.

Another object of this invention is to have a tailstock driving assembly that may be simply moved from engine lathe to engine lathe.

Another object of this invention is to facilitate movement of the tailstock toward the workpiece without using a lathe carriage.

Yet another object of this invention is to automatically stop and alarm upon reaching a predetermined distance of the tool into the workpiece.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

DESCRIPTION OF THE PREFERRED EMBODIMENTS(S)

The structure portion of the invention comprises three main elements: 1) a driving or translating assembly 32; 2) a transmission assembly 33; and 3) a feed frame or unit 30.

The tailstock driving assembly 32 of the embodiments shown is a screwjack. A screwjack comprises a cover 38 with an indent 42 on a distal portion thereof. Telescoped within the cover 38 is a push tube 36. This push tube 36 has a groove 40 that is complimentary to the indent 42 of the cover 38. The purpose of the indent 42 and groove 40 is to insure that the push tube 38 does not rotate as it telescopes in and out of the cover 38.

The push tube 36, as telescoped within the cover, has at least a portion of its internal surface threaded. The threaded portion of the push tube 36 is then threaded over a lead screw 34 which resides within the cover 38. Telescoping in and out of the push tube 36 then is accomplished by rotating the lead screw 34. As the lead screw 34 is turned, the push tube 36, by virtue of its inability to rotate because of the groove 40 and indent 42, is forced to telescope in or out of the cover 38. The cover 38 is securely fastened to the feed frame by virtue of weld 50. A readily available common jack may be easily modified for a driving assembly 32. A second method of advancing the push tube 36 in an out of the cover 38 is by nut 37 threaded over lead screw 34. Nut 37 is then rigidly attached to push tube 36 such that rotation of the lead screw 34 moves nut 37 which then moves the push tube 36.

The actual physical connection between the tailstock driving assembly and the tailstock is accomplished by an extension receptacle 44, an extension 46 and a jack 96. The extension receptacle 44 is simply a short tube attached to the push tube 36, being approximately 4"–6" in length. The extension 46 has an outside diameter slightly smaller than the inside diameter of the extension receptacle 44. One end of the extension 46 may be placed against a lower portion of the tail stock 14. The other end of the extension 46 is slid into the extension receptacle 44. The preferred procedure is to slide one end of extension 46 into a screw jack 96. Then the other end of the jack 96 is placed against the lower portion of the tail stock 14. The jack 96 acts as an adjustment mechanism to connect the push tube 36 to the tailstock 14. As the push tube 36 telescopes out of the cover 38, force is exerted on the tailstock via extension receptacle 44, extension 46 and jack 96. A plurality of extensions 46 of different lengths may be used.

The device further includes a transmission assembly 33, mounted on and within a feed frame 30, whose function is to extract power from a power shaft 22 of the engine lathe to drive the lead screw 34 of the tailstock driving assembly 32. The feed frame 30 surrounding the transmission assembly 33 together form a power unit 31. Rotational energy is extracted from the power shaft 22 via a drive sprocket 56 mounted thereon. The drive sprocket transfers this rotational energy to a main sprocket 54 via forward chain 57 and several idlers 52. The main sprocket 54 has main sprocket chain teeth 53 on a large circumference, and main sprocket dogs 55 on a small circumference thereon. The main sprocket 54 is journalled around a rotor 66 near one end. The rotor 66 is attached to the lead screw 34 of the tailstock driving assembly 32 by shear bolt 35. It is this device which transfers rotational energy from the transmission assembly to the tailstock driving assembly when the dogs 55 are mated with the dogs 63 on a shift tube 62.

A retract sprocket 60 is journalled on the other end of the rotor 66. The retract sprocket 60 has retract sprocket chain teeth 61 on a large circumference and male splines 64 on a small circumference. As the name implies, the retract sprocket 60 is used to retract the push tube 36 into the cover 38 by reversing the rotational direction of the lead screw 34 in the tailstock driving assembly 32.

A shift tube 62 is between the main sprocket 54 and the retract sprocket 60. The shift tube 62 is placed on the rotor 66 such that it may be axially translated between the main sprocket 54 and the retract sprocket 60. However, by virtue of complimentary keyways and a key, the shift tube transmits rotational energy to the rotor 66. The shift tube has dogs 63 proximal and complimentary to the dogs 55 on the main sprocket on one end, and female splines 65 proximal and complimentary to the retract sprocket 60 on the other end. There is enough distance between the main sprocket 54 and the retract sprocket 60 such that the shift tube 62, when in a neutral position, will not engage either sprocket.

Shift tube groove 68 is on an outer diameter of the shift tube 62. Two legs 71 from a yoke 70 straddle the shift tube groove 68. A nubbin 84 is on the distal end of each leg 71. These nubbins 84 are positioned coaxially on the legs 71 such that their axis substantially intersects the axis of the shift tube. The nubbins 84 are within the shift tube groove 68. Shift stick 72 extends upward from the yoke 70. The shift stick 72 is pivoted to frame 30 by hinge 74 and extends upward through shift plate 76. Movement of the shift stick 72 on the top end creates movement on the bottom end at the yoke in the opposite direction.

The above elements determine the operation of the transmission assembly in all three of its possible positions; forward drive, neutral and reverse.

Figure 1:
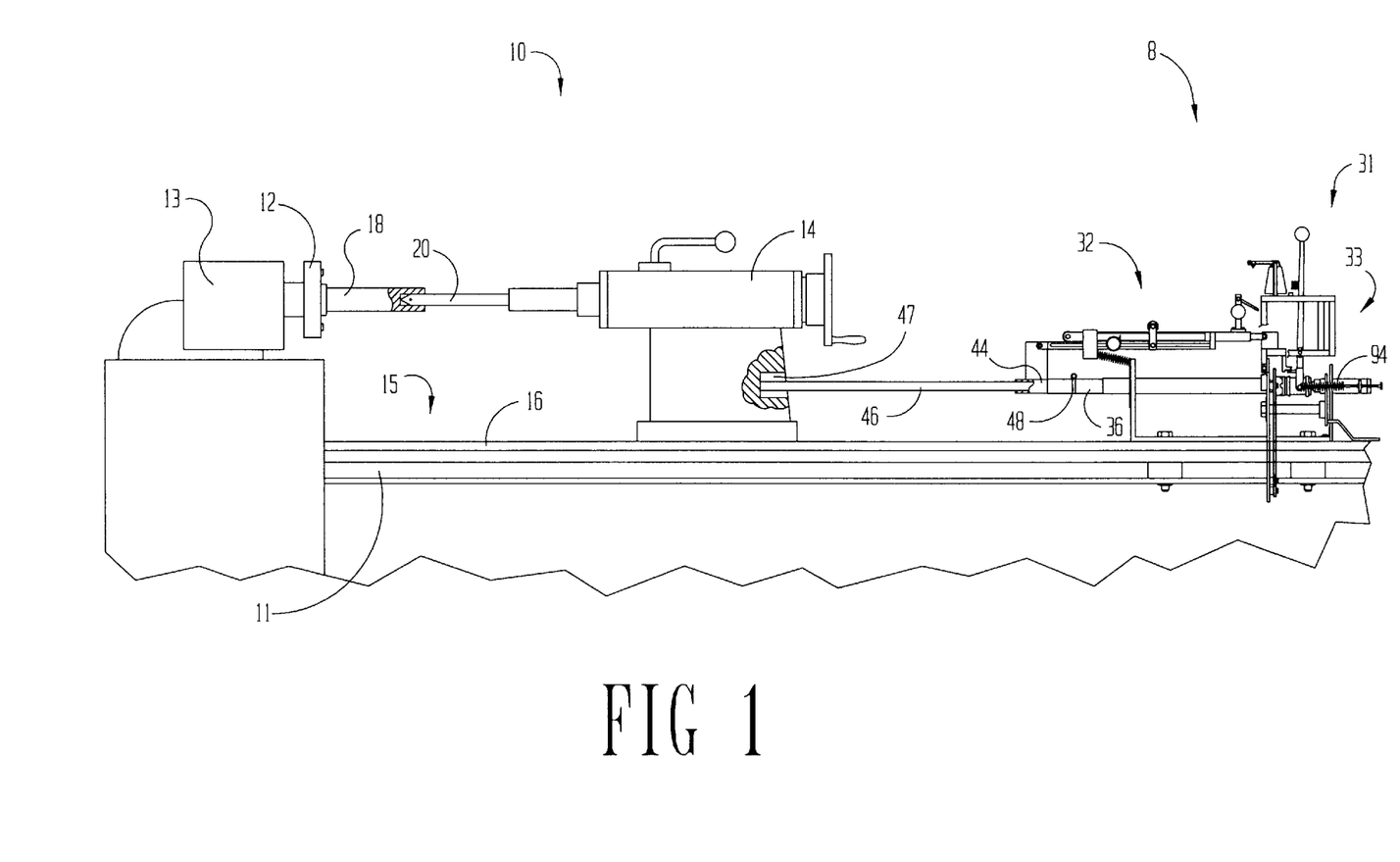
FIG. 1 Elevation view as mounted on an engine lathe.
Figure 2:
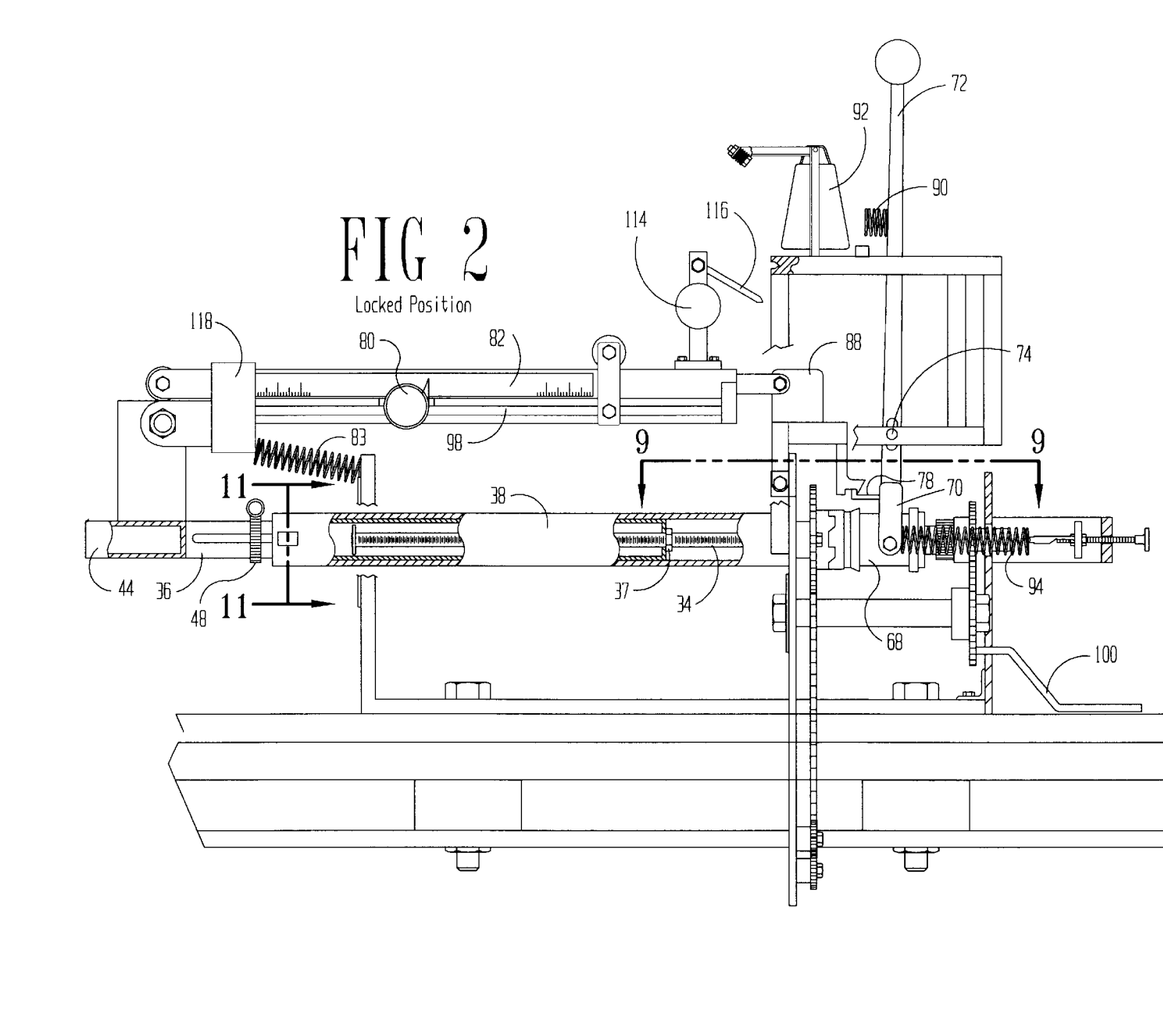
FIG. 2 Cutaway elevation view in a forward drive position.

In a forward drive position (FIG. 2) the drive sprocket 56 extracts rotational energy from the power shaft 22. Via forward chain 57 this rotational energy is transferred to the main sprocket 54. Shift stick 72 is shifted within the shift plate 76 to force movement of the yoke 70. Movement of the yoke 70, by virtue of the nubbins 84 in the shift tube groove 68, forces the shift tube 62 and the dogs 63 to engage complimentary dogs on the main sprocket 55 such that the rotation of the main sprocket 54 then rotates the shift tube 62. The main sprocket dogs 55 and the shift tube dogs 63 form a forward clutch assembly. Rotation of the shift tube 62, by its keyed connection, causes rotation of the rotor 66. Rotor 66 then turns lead screw 34 within the tailstock driving assembly 32.

Figure 4:
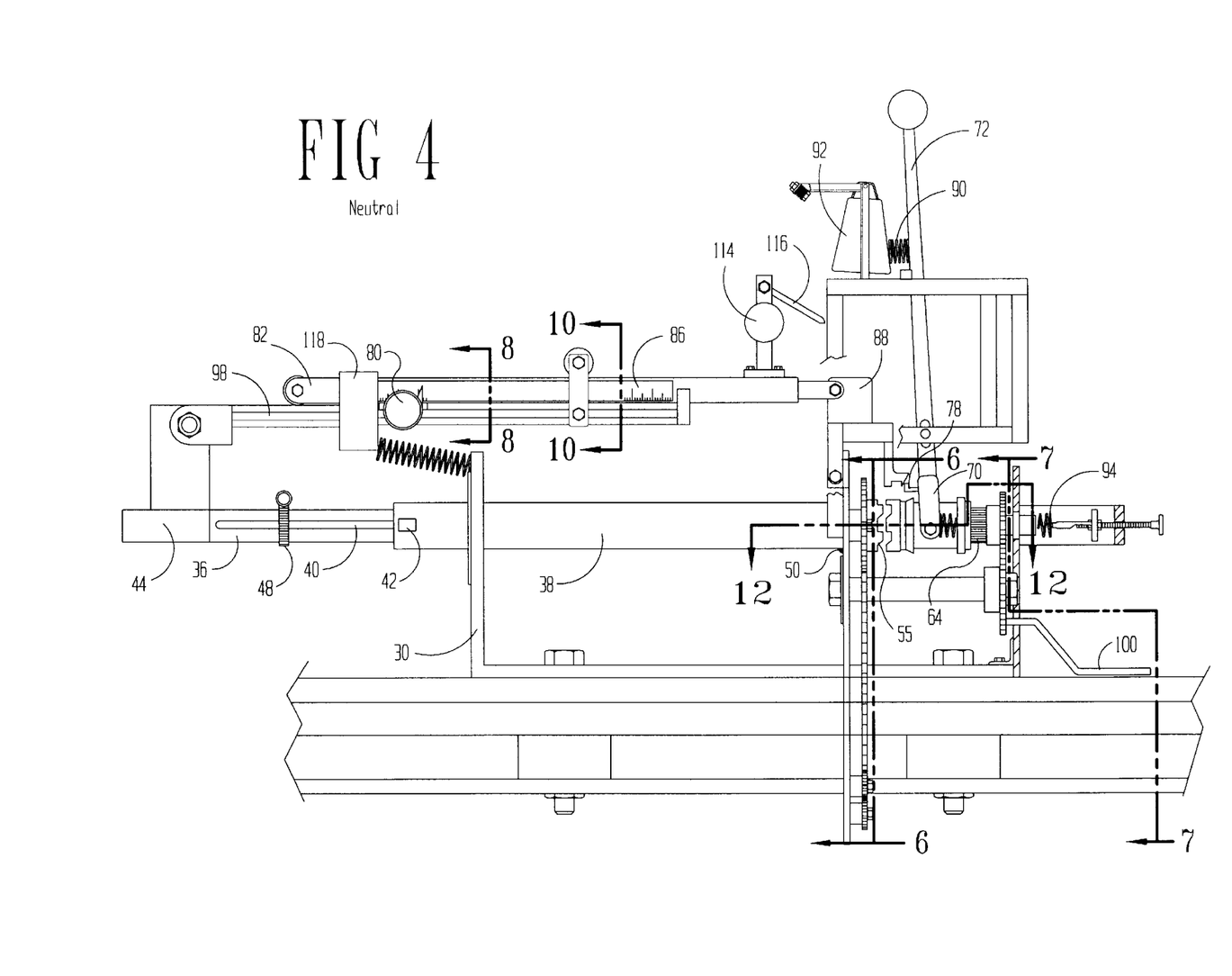
FIG. 4 Elevation view in a neutral position.
Figure 5:
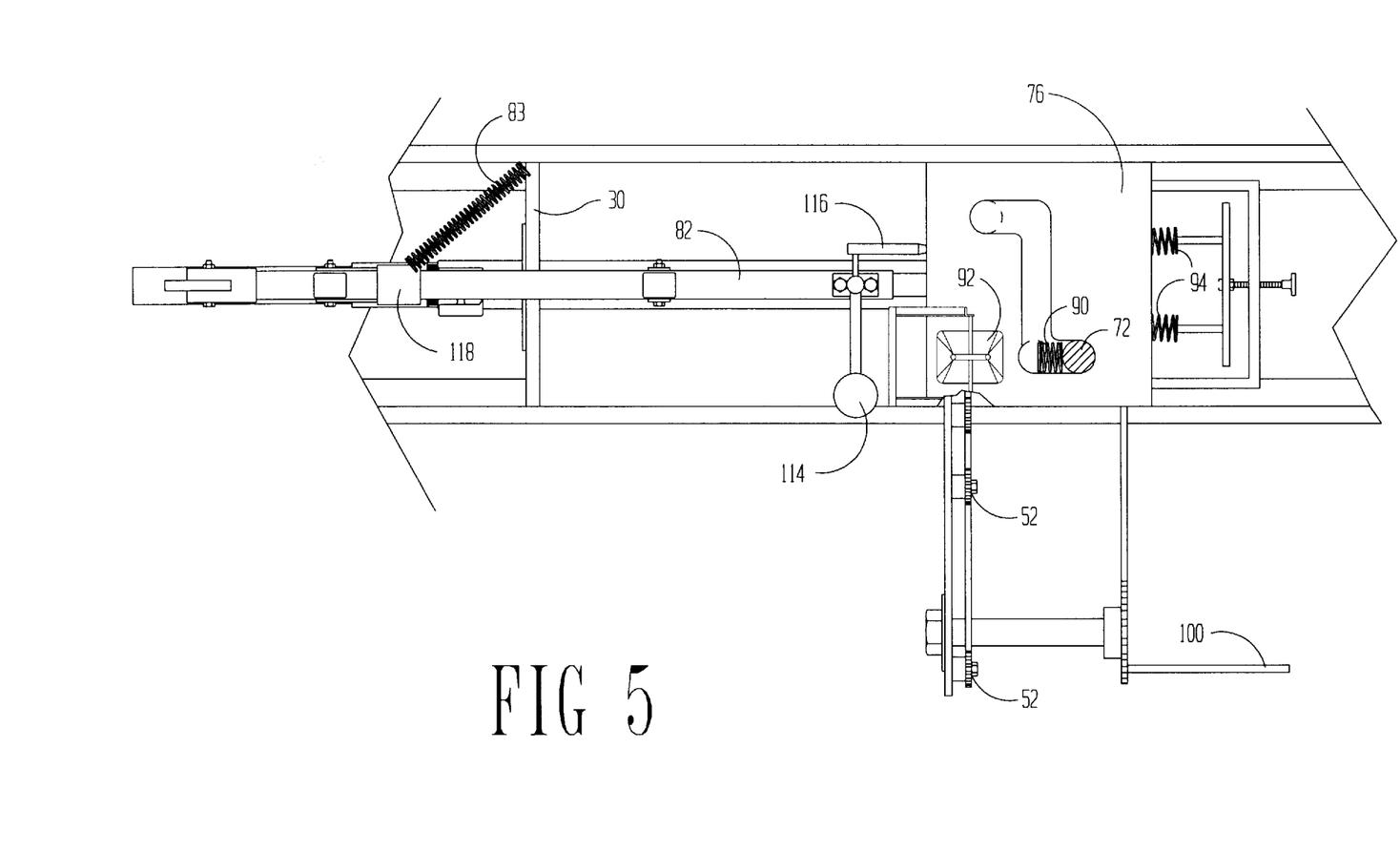
FIG. 5 Top plan view.
Figure 6:
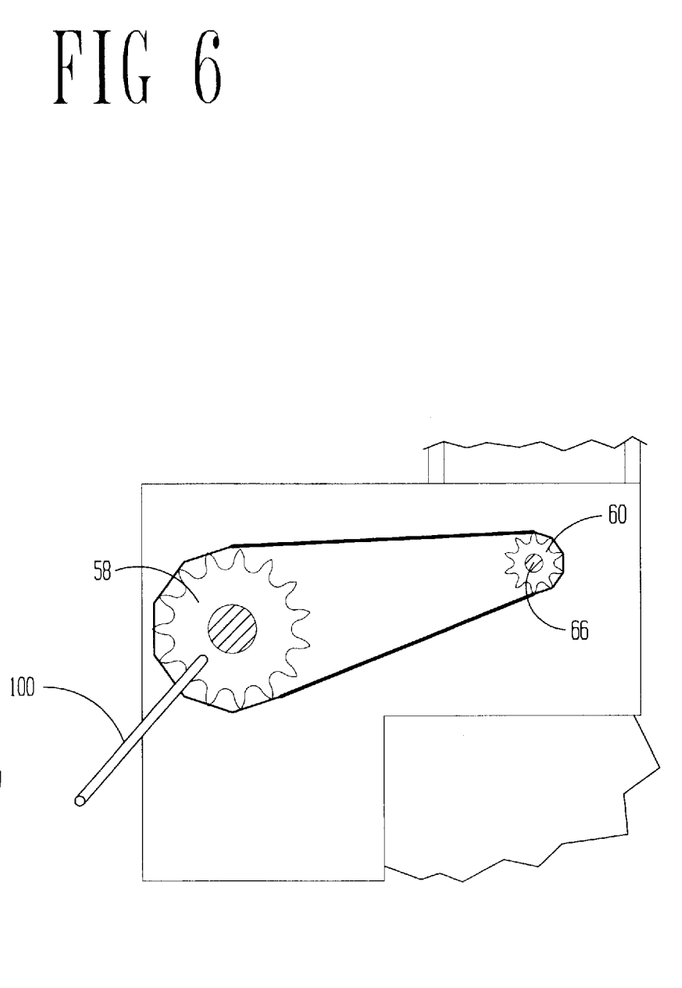
FIG. 6 Elevation view of the forward chain assembly.
Figure 7:
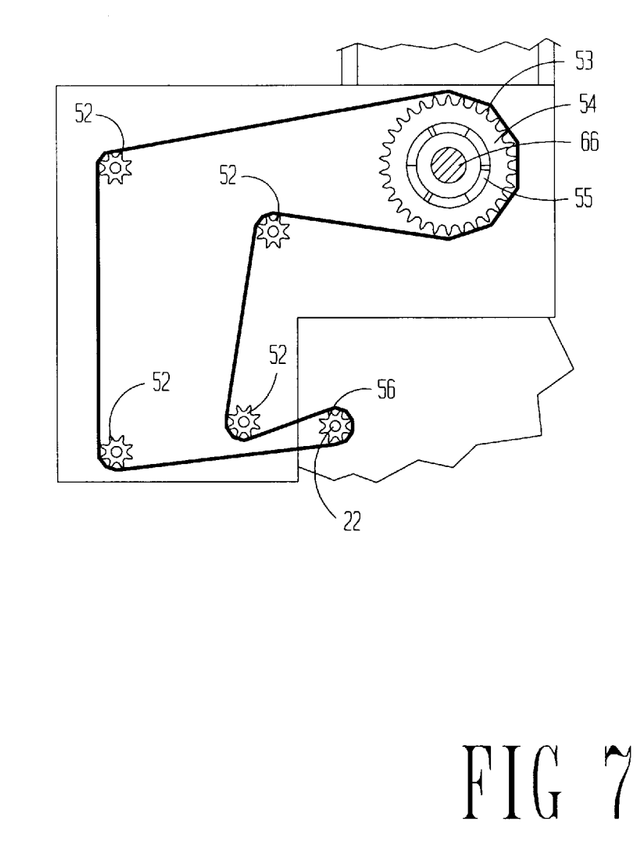
FIG. 7 Elevation view of the reverse chain assembly.
Figures 8, 11:
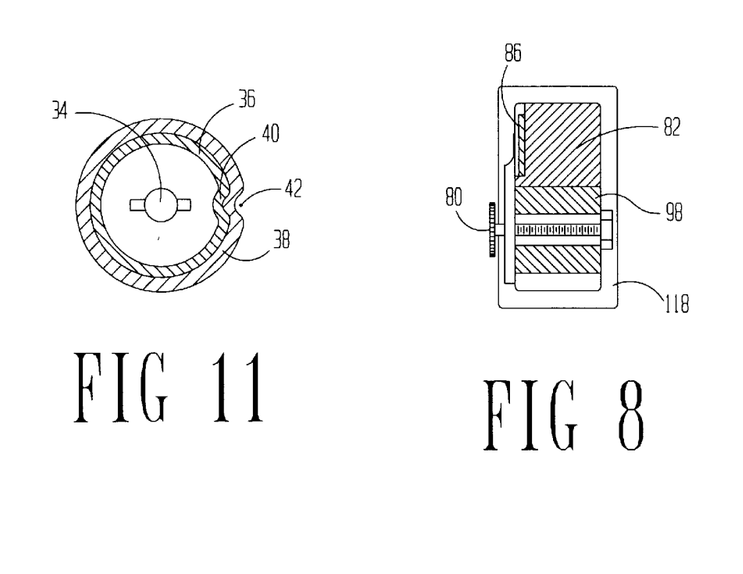
FIG. 8 is a sectional view taken on line 8—8 of FIG. 4.
FIG. 11 Cross-section of the drive assembly substantially along line 11—11 of FIG. 2.
Figure 9:
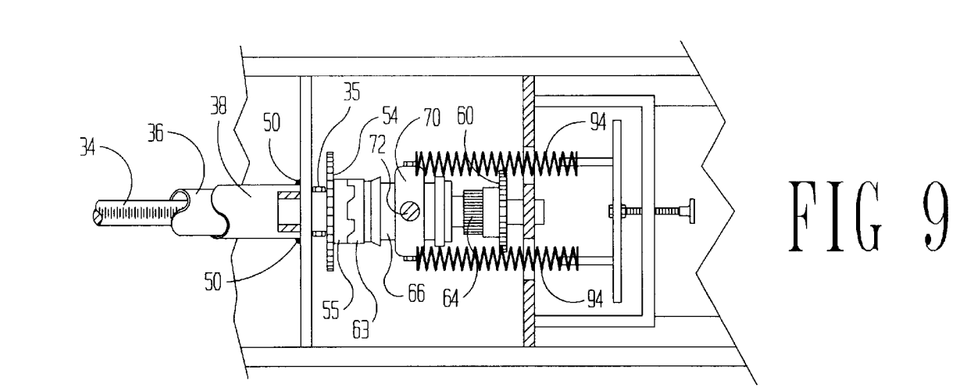
FIG. 9 Cutaway view of the transmission assembly taken substantially along line 9—9 of FIG. 2.
Figure 10:
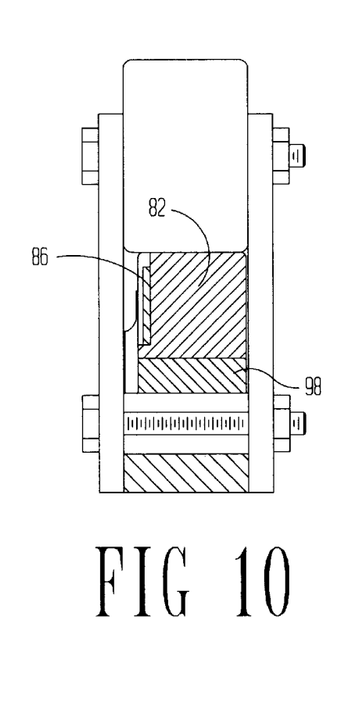
FIG. 10 Cross-section of the release bar substantially along line 10—10 of FIG. 4.

Neutral position (FIG. 4) is obtained by moving the shift stick 72 to a neutral position on the shift plate 76. This movement of the shift stick 72 moves the yoke 70 and the nubbins 84 in the shift tube groove 68. This movement moves the shift tube 62 to a neutral position which lies between the main sprocket 54 and the reverse sprocket 60. In this neutral position, the shift tube 62 does not engage either the main sprocket dogs 55 or the retract sprocket male splines 64.

Figures 3, 12:
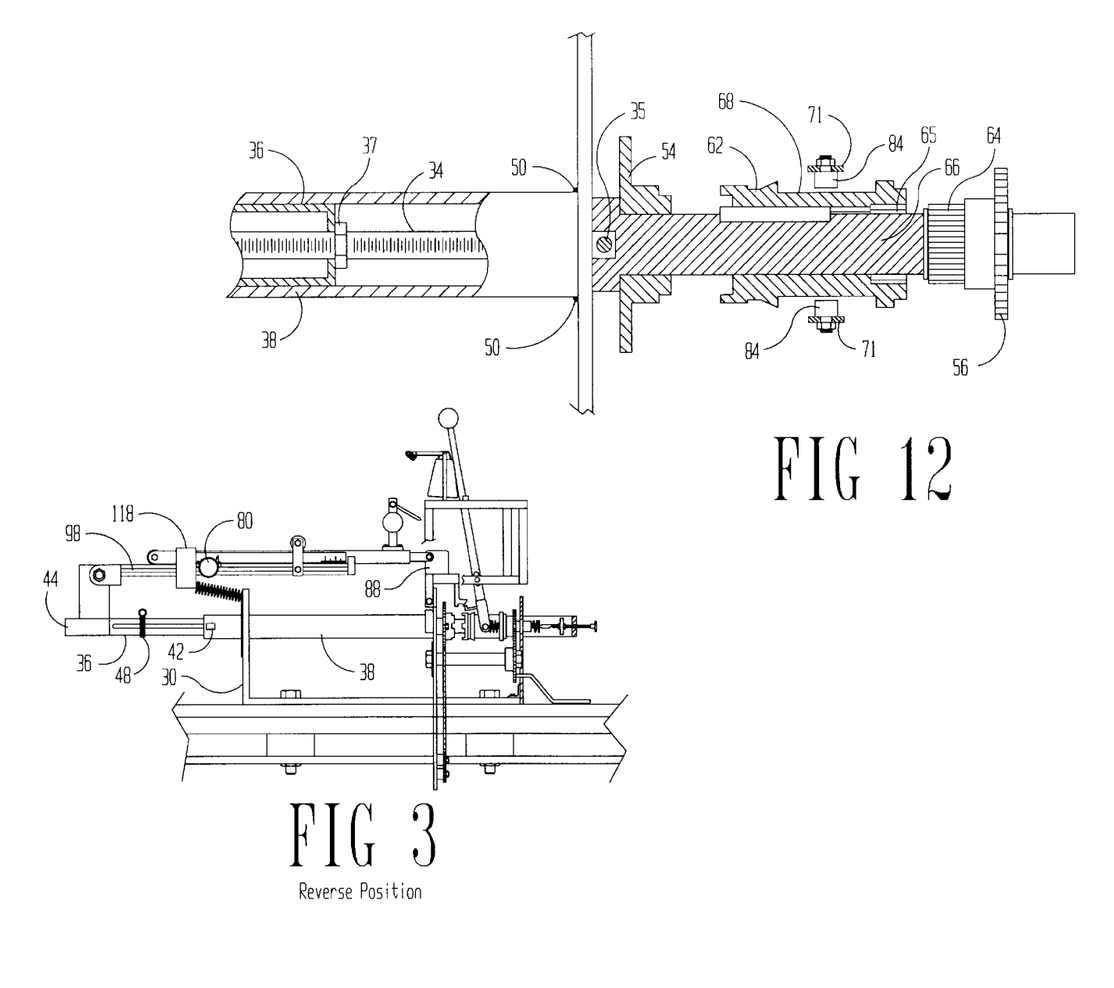
FIG. 3 Elevation view in a reverse drive position.
FIG. 12 Cross-section cutaway of the transmission assembly substantially taken along line 12—12 of FIG. 4.

In a reverse position (FIG. 3), the shift stick 72 is moved to a reverse position on the shift plate 76. Movement of the shift stick 72 causes a movement of the yoke 70 and the nubbins 84 within the shift tube groove 68. This movement of the yoke 70 moves the shift tube 62 such that the female spline 65 gears on the shift tube 62 engage with the male splines 64 of the retract sprocket 60. The male splines 64 and the female splines 65 form a reverse clutch assembly. Reverse rotational energy is then applied to a hand sprocket 58 by crank handle 100 which transfers this energy via reverse chain 59 to the retract sprocket 60. By virtue of the meshing of the splines between the shift tubes 62 and the retract sprocket 60, the reverse rotational energy is transferred to the rotor 66 which then transfers said energy to the lead screw 34 of said tailstock driving assembly 32.

Another important feature of the device is its ability to stop the boring operation at a predetermined distance. Stopping is accomplished by virtue of a release bar 82. Release bar 82 is biased toward the transmission assembly by release spring 83. In a rest position then, release bar spring 83 biases release bar 82 toward the transmission assembly 33 which tends to rotate rocker 88 clockwise, as seen in the figures. This rest position is substantially the same when the invention is latched in a forward drive or in a neutral position. A graduated scale 86 is on the release bar 82 of the tailstock driving assembly 32. A knurled knob 80 is slidably mounted on a parallel bar 98 which connects to the extension receptacle 44 such that there is a one to one correspondence between movement of the push tube 36 and the location of the knurled knob 80 on the graduated scale 86. Operation of the automatic stop is accomplished by setting the knurled knob 80 to the appropriate position indicated on the graduated scale 86 with the drill tool contacting the work and the push tube 36 fully retracted. Once the operation has begun and the push tube 36 begins to extend, the knurled knob 80 moves along the release bar 82. The release bar 82 works complimentary with a rocker 88 and a latch 78, on the shift stick 72, such that in a latched state, the release bar 82 will hold the shift stick 72 in the forward drive position by virtue of latch 78. As the knurled knob 80 on the graduated scale moves forward with the push tube 36, the knurled knob 80 comes in contact with a portion of the release bar 82. As the knurled knob 80 extends slightly further the release bar 82 moves which rotates rocker 88 that then releases the latch 78 on the shift stick 72.

Handle 114 is attached on the top of release bar 82. Handle 114 serves as a manual stop of the tailstock translation. By pushing handle 114 toward the tailstock, push bar 82 moves to release the latch 78 by rotating rocker 88, exactly the same as the knurled knob 80 does as described above. Lockout 116, on an upper portion of handle 114, serves as a mechanism to lockout forward latching. By extending lockout 116 to be substantially perpendicular to handle 114, and further contacting the feed frame 30 at the lockout receptacle 118, the push bar 82 is shifted such that rocker 88 is rotated counter clockwise as seen in drawings generally. This rotation of rocker 88 then does not allow the latch 78 to hold the shift tube 62 in the forward drive position.

In the forward drive position the main sprocket dogs 55 and the shift tube dogs 63 mesh to transfer rotational energy from the main sprocket 54 through the shift tube 62 to the rotor 66. The complimentary teeth do not have walls parallel to the diametrical plane; rather, the teeth are cut at an angle of between 8° to 10° off perpendicular. The cut is oriented such that imparting rotational energy from the main sprocket 54 to the shift tube 62 tends to unmesh the complimentary dogs. In the forward drive position, the dogs are held meshed by operation of the latch 78 on the shift stick 72 in combination with the rocker 88. When the knurled knob 80 pushes the release bar 82 such that the latching is released, the force being exerted by transfer of rotational energy between the main sprocket 54 and shift tube 62, in combination with bias springs 94, give a snap action effect to move the shift tube 62 to a neutral position. This snap action minimizes the possibility of damage to the dogs caused by partial meshing.

Further, this snap action, in combination with ring spring 90 and bell 92, operate to notify that the forward advancement of the tailstock has completed. The ring spring 90 is rigidly attached to the shift stick 72. When locked in the forward drive position, the shift stick 72 is locked away from the bell 92 and the bias springs 94 are stretched. Once the shift stick 72 is released by rotation of rocker 88, the bias springs snap the shift stick 72 to the neutral position. This snapping causes the ring spring 90 to contact the bell 92 with enough force that it causes the bell to ring. This ringing notifies the lathe operator that forward motion of the tailstock 14 has ceased and attention is required.

Figure 13:
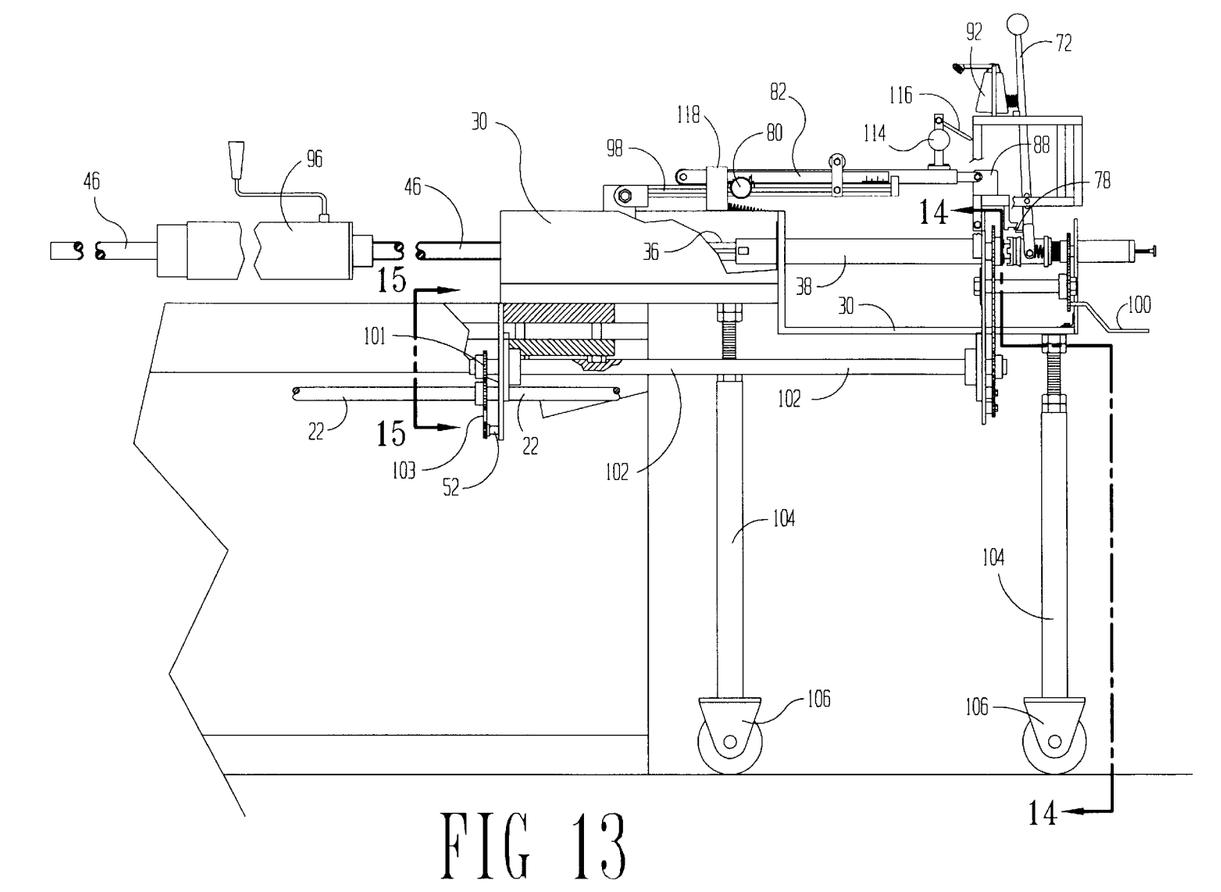
FIG. 13 Elevation view as mounted on legs.
Figure 14:
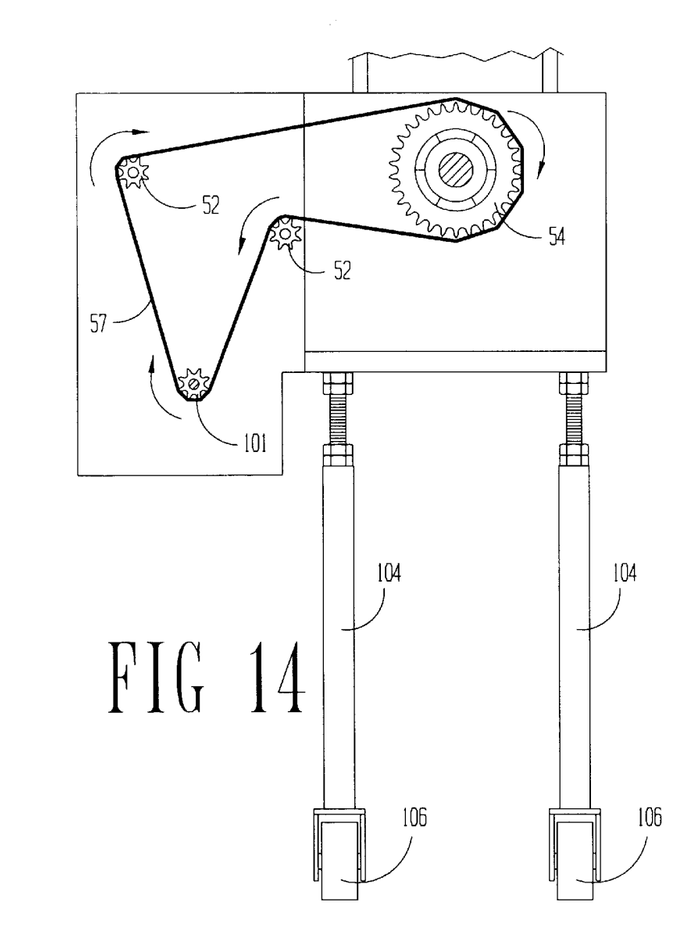
FIG. 14 Cutaway view of the forward chain assembly substantially along line 14—14 of FIG. 13.

In a second embodiment of the invention, the bulk of the device is moved off the bed 15 of the lathe and instead is placed on adjustable height legs 104 with casters 106 on the bottom thereof(FIG. 13). In this embodiment, only a portion of the frame actually contacts the bed of the lathe.

Figure 15:
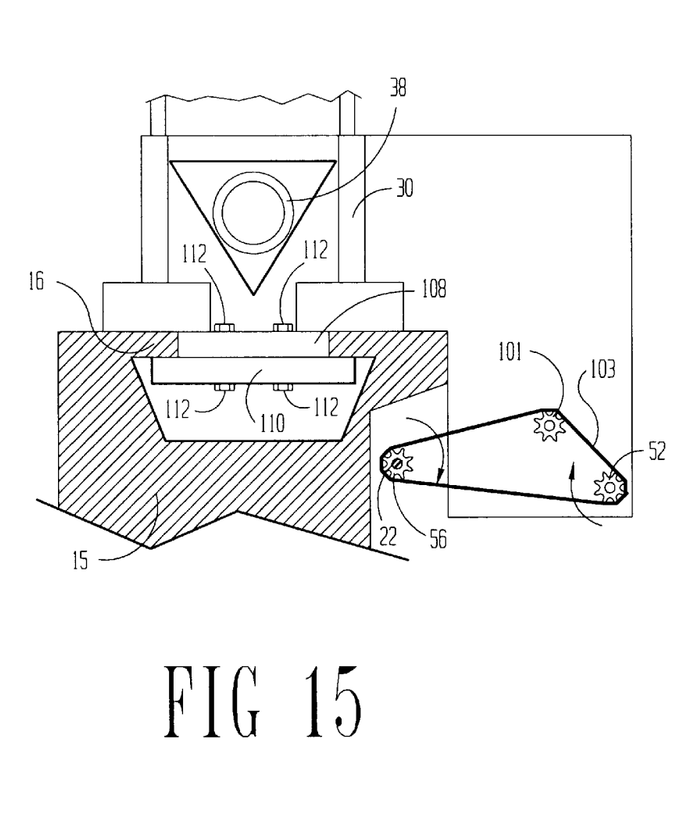
FIG. 15 Cutaway view of the front substantially along line 15—15 of FIG. 13.

The invention is capable of transferring large forces necessary to move the tailstock against hard workpieces; indeed, the screwjack used as the tailstock translating assembly 33 in the embodiments shown was rated at 3000 lb. Given that, in this second embodiment, the connection between the invention and lathe must be able to hold the invention in place as the tailstock is translated. FIG. 15 shows a cross-section of the lathe with the invention attached on the end opposite the rotable chuck 12. The bed 15 of a lathe forms a channel and the tracks 16 tend to form an overhang. This second embodiment then is attached to the lathe by operation of base plate 108, backing plate 110, and clamping bolts 112.

By virtue of placement of the transmission assembly in this second embodiment, an extension shaft 102 is utilized to transfer rotational energy from the power shaft 22 of the lathe to the transmission assembly 33. This is required because the invention in this embodiment lies mostly beyond the end of the bed of the lathe. Drive sprocket 56 is attached to the power shaft of the lathe close to the end. Extension shaft chain 103 connects the drive sprocket 56 to extension shaft sprocket 101. A sprocket on the other end of the extension shaft 102 then transfers rotational energy to the transmission assembly 33.

Attaching this second embodiment to a lathe begins with the step of placing the invention to extend outward from the end of the lathe. The height of the device then must be adjusted to match the height of the particular lathe to which attachment is desired. Height adjustment is accomplished by adjusting the lengths of legs 104. Once the invention is the correct height and level, the base plate 108 under the tailstock driving assembly 32 is overlapped over the bed 15 of the lathe. Backing plate 110 is placed in the channel and clamping bolts 112 are tightened to squeeze the bed 15 between the two plates. Extension shaft chain 103 is placed over the drive sprocket 56 and further placed over extension shaft sprocket 101. The second embodiment is now ready for use consistent with the explanation above for the bed mounted embodiment.

The embodiments shown and described above are only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

It will be understood that while the descriptions above use rotational energy from a power shaft for forward movement and manual energy for reverse movement, any source of rotational energy capable of supplying needed power would suffice as a source for this invention.

Many details of construction have not been expanded upon here because their construction is well within one of ordinary skill in the art. For example, cross bracing as support between the legs 104. Also, as shown in the drawings and alluded to above, the legs 104 have a mechanism for adjusting their length which therefore is an adjustment of the relative height of the invention overall. Further, all the moving parts are covered by chain guards and covers to reduce the possibility of entangling fingers or articles of clothing. As a final example, the invention could include racks to hold the varying length extensions 106 required.

The drawings show the complimentary dogs, main sprocket 55 and shift tube dogs 63, with angles thereon as described above. The drawings show the angles exaggerated merely to exemplify the existence and do not represent the actual angles used.

I claim as my invention:

1. On an engine lathe having,
   a) a bed,
   b) a headstock with a chuck fixed on the bed,
   c) a tailstock slidable mounted on tracks on the bed, and
   e) a power shaft extending along the bed parallel to the tracks;
   in a method of operation which includes
   f) chucking a workpiece on the chuck,
   g) mounting a tool on the tailstock,
   h) sliding said tailstock along the tracks,
   i) contacting said tool to said workpiece,
   j) rotating said workpiece, an improved method of operation comprising:
   k) clamping a power unit to the tracks on the bed of the lathe,
   l) connecting a sprocket chain from a sprocket on said power shaft to a sprocket on said power unit thus transferring rotational energy from said power shaft to said power unit,
   m) moving a translating assembly on the power unit toward the tailstock by
   n) engaging a forward clutch on the power unit connected to said translating assembly by moving a stick shift into an operation position, and
   l) pushing said tailstock along the track toward said workpiece at a constant velocity with the power unit, thereby
   m) advancing the tool against the workpiece.

2. The method as defined in claim 1 further comprising:
   q) stopping travel of said tailstock toward said workpiece at a predetermined position, by
   r) disengaging said forward clutch from said translating assembly.

3. The method as defined in claim 2 futher comprising:
   s) engaging a reverse clutch assembly, thereafter
   t) backing said tailstock away from said workpiece by manual power.

4. The method as defined in claim 1 futher comprising:
   q) biasing the shift stick to a neutral position,
   r) setting a stop position on a graduated scale attached to a release bar with a knob, then performing the aforesaid step of
   s) moving the shift stick into an operation position, and
   t) latching the shift stick with a latch in the operation position,
   v) pushing the release bar with the knob, and thereby
   w) releasing the latch on the shift stick, thus
   x) permitting the biased shift stick to disengage the forward clutch assembly at a predetermined position, and
   y) ringing an alarm bell.

5. The method as defined in claim 4 further comprising:
   z) moving the shift stick to a reverse position, thus
   aa) engaging a reverse clutch assembly thereby
   bb) connecting said tailstock driving assembly to a manually operated power source.

6. The method as defined in claim 1 further comprising:
   q) before the pushing step, rotating the power shaft at a chosen speed.

7. The method as defined in claim 1 further comprising:
   q) placing a first extension between said translating assembly and tailstock.

8. The method as defined in claim 7 further comprising:
   r) removing said first extension from between said translating assembly and tailstock and placing a second extension between said translating assembly and tailstock.

* * * * *